(12) United States Patent
Coronado et al.

(10) Patent No.: US 9,858,418 B2
(45) Date of Patent: Jan. 2, 2018

(54) REDUCING DELAYS ASSOCIATED WITH RESTORING QUARANTINED FILES

(71) Applicant: International Business Machines Corporation, Armonk, NY (US)

(72) Inventors: Juan A. Coronado, Tucson, AZ (US); Sara M. Coronado, Tucson, AZ (US); Christina A. Lara, Tucson, AZ (US); Lisa R. Martinez, Escondido, CA (US)

(73) Assignee: International Business Machines Corporation, Armonk, NY (US)

( * ) Notice: Subject to any disclaimer, the term of this patent is extended or adjusted under 35 U.S.C. 154(b) by 13 days.

(21) Appl. No.: 14/726,291

(22) Filed: May 29, 2015

(65) Prior Publication Data

US 2016/0350533 A1     Dec. 1, 2016

(51) Int. Cl.
    *G06F 21/56*     (2013.01)

(52) U.S. Cl.
    CPC .......... *G06F 21/568* (2013.01); *G06F 21/562* (2013.01); *G06F 2221/034* (2013.01)

(58) Field of Classification Search
    CPC ......... G06F 21/568; G06F 21/56; G06F 21/55
    See application file for complete search history.

(56) References Cited

U.S. PATENT DOCUMENTS

| | | | |
|---|---|---|---|
| 7,581,250 B2 | 8/2009 | Sitze | |
| 8,312,548 B1 * | 11/2012 | Cnudde | G06F 21/56 707/610 |
| 8,447,734 B2 * | 5/2013 | Kirshenbaum | G06F 11/1448 707/640 |
| 8,495,037 B1 | 7/2013 | Westenberg | |
| 8,607,342 B1 | 12/2013 | Liao et al. | |
| 8,776,235 B2 | 7/2014 | Coronado et al. | |
| 2004/0236960 A1 * | 11/2004 | Zimmer | G06F 21/562 726/24 |
| 2005/0071379 A1 * | 3/2005 | Kekre | G06F 3/0605 |
| 2006/0021032 A1 | 1/2006 | Challener et al. | |
| 2006/0149889 A1 * | 7/2006 | Sikha | G06F 11/1469 711/100 |
| 2007/0239949 A1 * | 10/2007 | Childs | G06F 11/1464 711/162 |
| 2008/0178290 A1 * | 7/2008 | Besch | G06F 21/53 726/22 |
| 2009/0070627 A1 * | 3/2009 | Lohn | G06F 11/0793 714/15 |

(Continued)

*Primary Examiner* — Khang Do
(74) *Attorney, Agent, or Firm* — Nelson & Nelson; Daniel P. Nelson; Alexis V. Nelson

(57) ABSTRACT

A method to reduce delays associated with restoring quarantined files is disclosed. In one embodiment, such a method includes maintaining, for a file, a "current" pointer pointing to a current copy of the file and a "backup" pointer pointing to a virus-free backup copy of the file. The method receives an I/O request (a read or write request) to access the file. In response to receiving the I/O request, the method scans the current copy of the file for viruses. In the event a virus is discovered in the current copy, the method modifies the "current" pointer to point to the backup copy. This causes the backup copy to become the new current copy. The method then executes the I/O request with respect to the new current copy. A corresponding system and computer program product are also disclosed and claimed herein.

20 Claims, 10 Drawing Sheets

(56) References Cited

U.S. PATENT DOCUMENTS

| | | |
|---|---|---|
| 2009/0113151 A1 | 4/2009 | Teranishi et al. |
| 2011/0225128 A1* | 9/2011 | Jarrett .................... G06F 8/61 |
| | | 707/692 |
| 2012/0159631 A1 | 6/2012 | Niemela et al. |
| 2013/0024423 A1* | 1/2013 | Doshi ............... G06F 11/1448 |
| | | 707/640 |
| 2013/0166521 A1* | 6/2013 | Ghatty ............. G06F 11/1469 |
| | | 707/695 |
| 2014/0007239 A1 | 1/2014 | Sharpe et al. |
| 2014/0059687 A1 | 2/2014 | Coronado et al. |

* cited by examiner

REDUCING DELAYS ASSOCIATED WITH RESTORING QUARANTINED FILES

BACKGROUND

Field of the Invention

This invention relates to systems and methods for reducing delays associated with quarantined files.

Background of the Invention

Scanning for viruses is routinely performed on data stores to protect data and prevent system damage or corruption. In many cases, if an antivirus product detects a virus associated with a file and the virus cannot be removed or fixed, the file is quarantined until the file can be replaced with a previous good copy of the file. In some cases, replacing the quarantined file may require retrieving an earlier version of the file from a backup, such as from a backup on disk or tape, and then restoring the file to the server where the quarantined file is located. This can require a significant amount of time (e.g., several hours to multiple days) and the file may be inaccessible during this period. For example, where a backup is located on tape, restoring a file may require locating a tape cartridge where the backup copy is stored (which may be offsite), transporting the tape cartridge to a tape drive or library where the backup copy can be retrieved from the tape, loading the tape cartridge into the tape drive or library, and retrieving the backup copy. The backup copy may then need to be copied over to the storage system where the quarantined file is located.

In some cases, the backup copy may contain data that is older than a last known good copy of the data prior to infection with the virus. In other words, the backup copy may require the user to revert to a version that is significantly older than what the user may prefer or what is necessary. This is because various intermediate versions of the file may have been replaced or deleted in the period between backups. For example, if a file is backed up every week but the file is updated on average once a day, intermediate versions of the file between backups may be lost. Restoring a file to an intermediate version may be preferred to restoring it to older versions.

In view of the foregoing, what are needed are systems and to prevent delays associated with restoring quarantined files. Ideally, such systems and methods will enable files to be restored to a last known good copy of the files.

SUMMARY

The invention has been developed in response to the present state of the art and, in particular, in response to the problems and needs in the art that have not yet been fully solved by currently available systems and methods. Accordingly, the invention has been developed to provide systems and methods to reduce delays associated with restoring quarantined files. The features and advantages of the invention will become more fully apparent from the following description and appended claims, or may be learned by practice of the invention as set forth hereinafter.

Consistent with the foregoing, a method to reduce delays associated with restoring quarantined files is disclosed. In one embodiment, such a method includes maintaining, for a file, a "current" pointer pointing to a current copy of the file and a "backup" pointer pointing to a virus-free backup copy of the file. The method receives an I/O request (a read or write request) to access the file. In response to receiving the I/O request, the method scans the current copy of the file for viruses. In the event a virus is discovered in the current copy, the method modifies the "current" pointer to point to the backup copy. This causes the backup copy to become the new current copy. The method then executes the I/O request with respect to the new current copy. A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which.

DETAILED DESCRIPTION

Figure 1:
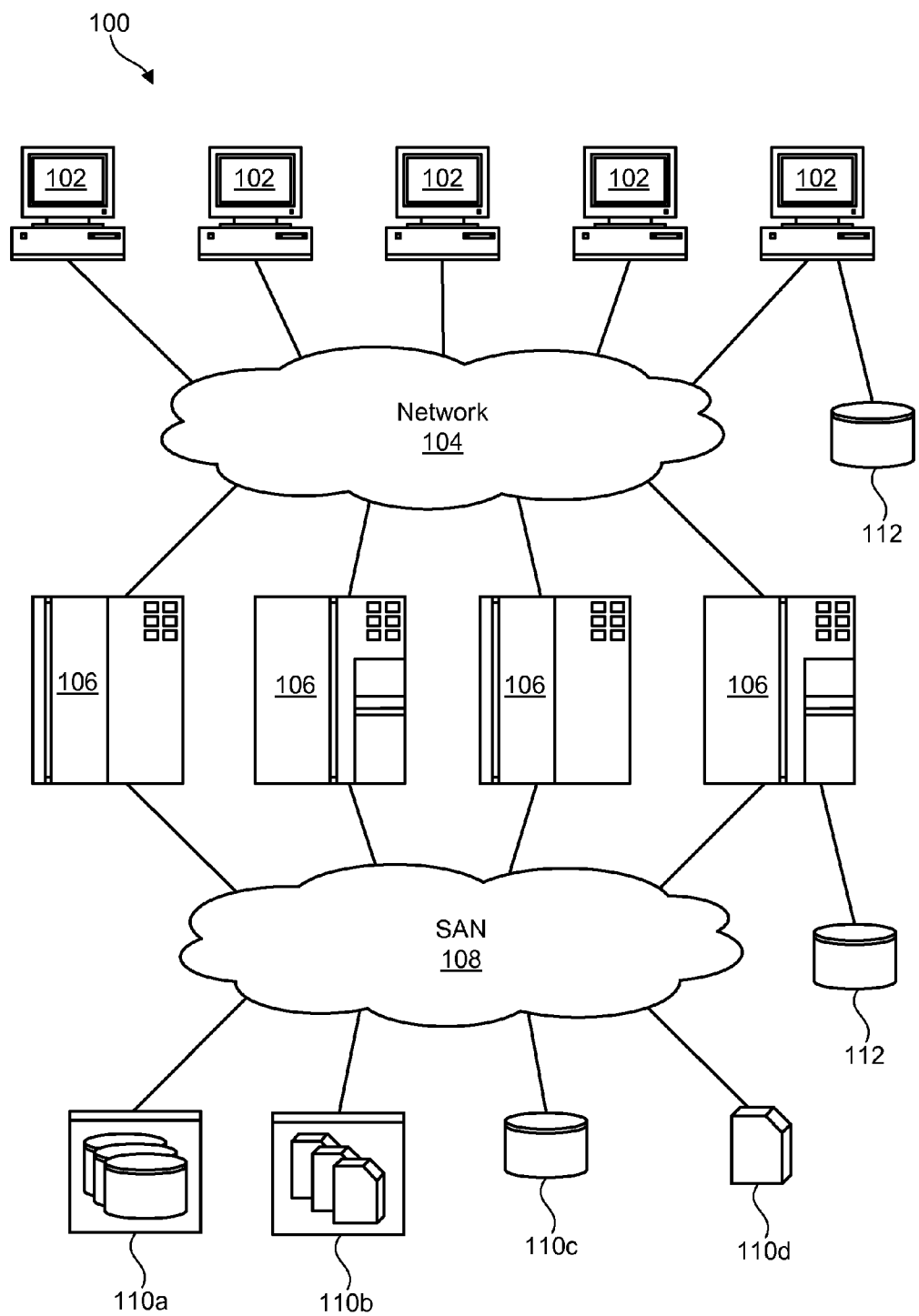
FIG. 1 is a high-level block diagram showing one example of a network environment where a system and method in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a network architecture 100 is illustrated. The network architecture 100 is presented to show one example of an environment where embodiments of the invention may operate. The network architecture 100 is presented only by way of example and not limitation. Indeed, the systems and methods disclosed herein may be applicable to a wide variety of different network architectures in addition to the network architecture 100 shown.

As shown, the network architecture 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "hosts" 106 or "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like.

The network architecture 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC) or iSCSI. In certain embodiments, a host system 106 or other server may function as an antivirus server 106 for scanning data on storage systems 110, 112 connected to the networks 104, 108.

Figure 2:
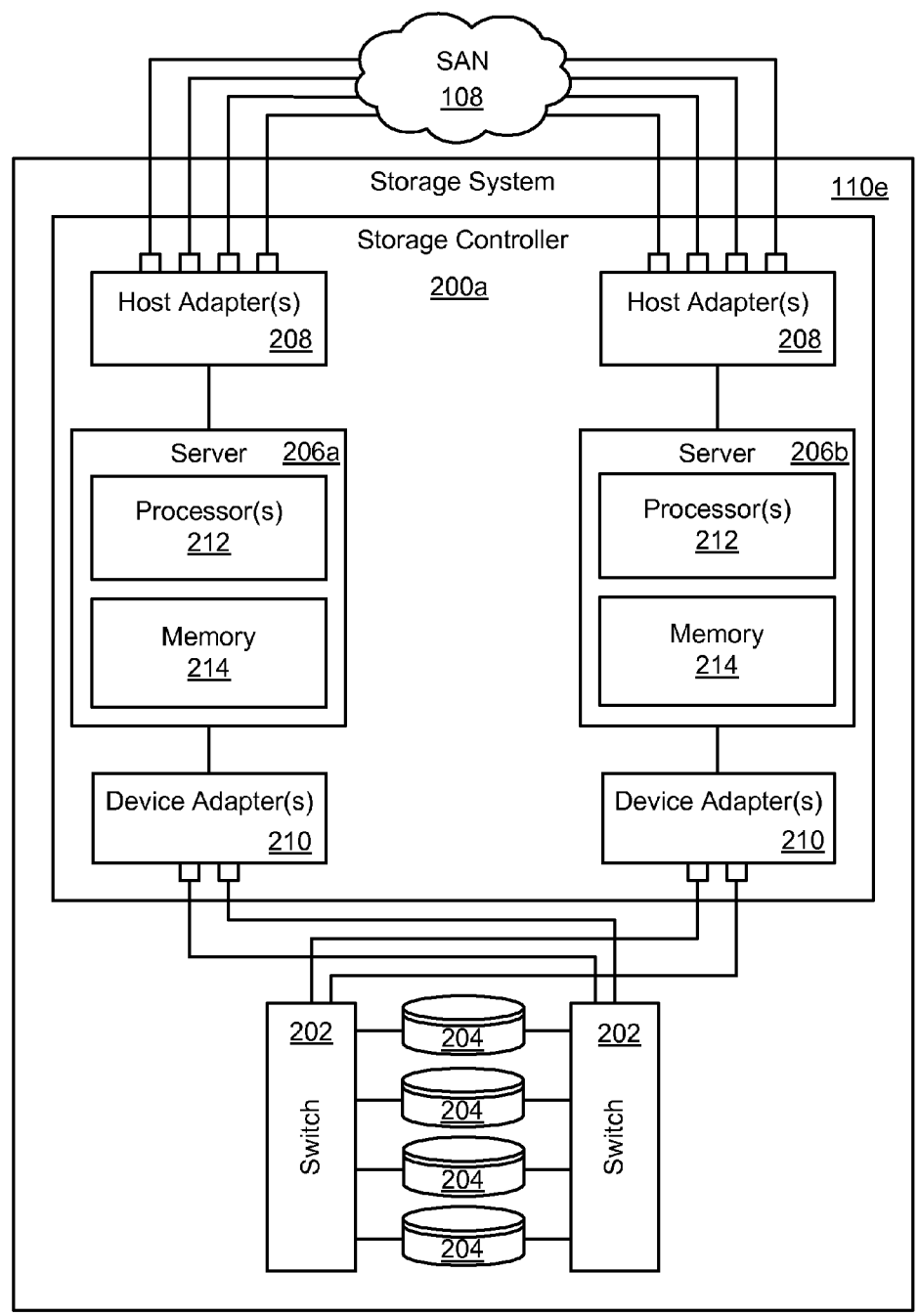
FIG. 2 is a high-level block diagram showing a first example of a storage system where a system and method in accordance with the invention may be implemented.

Referring to FIG. 2, one embodiment of a storage system 110e containing an array of storage drives 204 (e.g., hard-disk drives and/or solid-state drives) is illustrated. The internal components of the storage system 110e are shown since the systems and methods disclosed herein may, in certain embodiments, be implemented within such a storage system 110e, although the systems and methods may also be applicable to other storage systems or groups of storage systems. As shown, the storage system 110e includes a storage controller 200a, one or more switches 202, and one or more storage drives 204 such as hard disk drives and/or solid-state drives (such as flash-memory-based drives). The storage controller 200a may enable one or more hosts 106 (e.g., open system and/or mainframe servers 106) to access data in the one or more storage drives 204.

In selected embodiments, the storage controller 200a includes one or more servers 206. The storage controller 200a may also include host adapters 208 and device adapters 210 to connect the storage controller 200a to host devices 106 and storage drives 204, respectively. Multiple servers 206a, 206b provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, flash memory, disk drives, etc.). The volatile and non-volatile memory may, in certain embodiments, store software modules that run on the processor(s) 212 and are used to access data in the storage drives 204. These software modules may manage all read and write requests to logical volumes in the storage drives 204.

One example of a storage system 110e having an architecture similar to that illustrated in FIG. 2 is the IBM DS8000™ enterprise storage system. The DS8000™ is a high-performance, high-capacity storage controller providing disk and solid-state storage that is designed to support continuous operations. Nevertheless, the systems and methods disclosed herein are not limited to the IBM DS8000™ enterprise storage system 110a, but may be implemented in any comparable or analogous storage system or group of storage systems, regardless of the manufacturer, product name, or components or component names associated with the system. Any storage system that could benefit from one or more embodiments of the invention is deemed to fall within the scope of the invention. Thus, the IBM DS8000™ is presented only by way of example and is not intended to be limiting.

Figure 3:
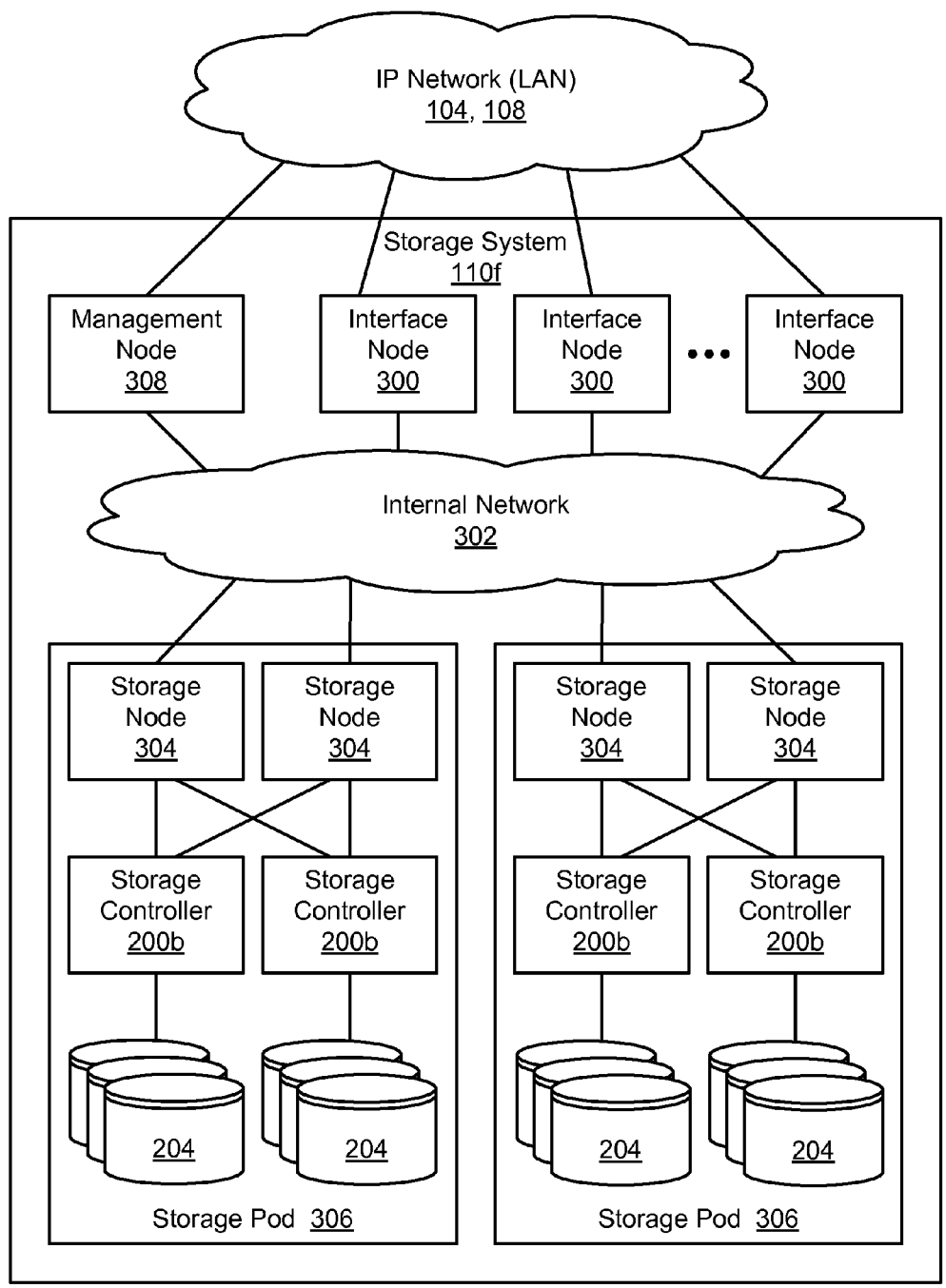
FIG. 3 is a high-level block diagram showing a second example of a storage system where a system and method in accordance with the invention may be implemented.

Referring to FIG. 3, another embodiment of a storage system 110f is illustrated. In the illustrated embodiment, the storage system 110f is a network-attached storage system. IBM's Scale Out Network Attached Storage (SONAS) has an architecture similar to the illustrated storage system 110f. In certain embodiments, systems and methods in accordance with the invention may be implemented within such a storage system 110f. Nevertheless, the storage system 110f is not limited to the IBM SONAS system but may include any other analogous or similar network-attached storage system 110f. The illustrated network-attached storage system 110f is simply provided by way of example and not limitation.

In certain embodiments, the network-attached storage system 110f may be configured to utilize Ethernet IP network technology associated with conventional LANs. Data may be sent to and from the network-attached storage system 110f over the LAN 104, 108 using the TCP/IP protocol. The network-attached storage system 110f may differ from direct attached storage (DAS) systems 112 or other network storage solutions such as SAN or iSCSI in that client I/O operations to the network-attached storage system 110f may use file level I/O protocols. File I/O may be used to specify a file to be accessed as opposed to directly addressing locations of data on the storage system 110f. The network-attached storage system 110f may receive the file I/O requests and translate these requests into direct addresses for accessing data on the underlying storage media.

As shown, the network-attached storage system 110f includes one or more interface nodes 300 to facilitate communication with the IP network 104, 108. The interface nodes 300 may provide file services to external application machines 106 running standard file access protocols such as NFS of CIFS. Performance and bandwidth scalability may be achieved by adding and removing interface nodes 300 from the network-attached storage system 110f. Each interface node 300 may include at least one processor and may have access to all files on the network-attached storage system 110f. The interface nodes 300 may be configured to balance loads dynamically and provide parallel performance to users accessing the network-attached storage system 110f.

Storage nodes 304 may be configured in high-availability pairs that are connected to one or more storage controllers 200b. The storage controllers 200b may, in turn, provide access to data on one or more storage drives 204. The storage nodes 304 may provide gateways to the storage controllers 200b and associated storage drives 204. In certain embodiments, a storage pod 306 may be made up of a pair of storage nodes 304, one or more storage controllers 200b, and one or more storage drives 204. In certain embodiments, all interface nodes 300 may access all storage on all storage nodes 304. Similarly, all storage nodes 304 may send data to any interface node 300.

In certain embodiments, a management node 308 may provide a central point for a system administrator to configure, monitor, and manage operations of the network-attached storage system 110f. The management node 308 may, in certain embodiments, support a graphical user interface (GUI) and/or a command line interface (CLI). The management node 308 may also, in certain embodiments, monitor overall health of the network-attached storage system 110f. The interface nodes 300, management node 308, and storage nodes 304 may be connected through a scalable, redundant internal network 302 or fabric 302 that allows data to be transferred between the interface nodes 300 and storage nodes 304 and thereby enable access to the storage drives 204.

Figure 4:
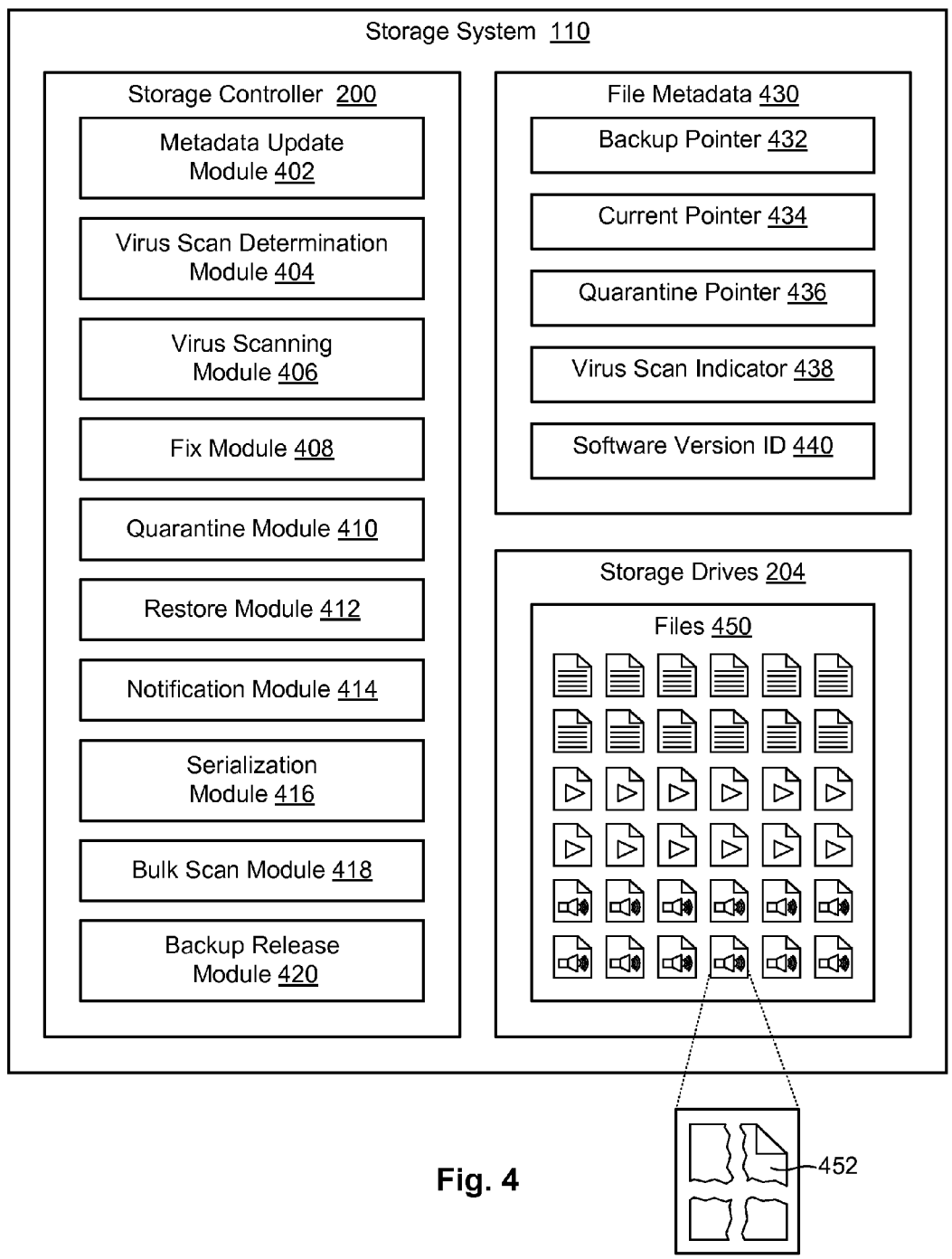
FIG. 4 is a high-level block diagram showing various modules and metadata that may be used in association with the invention.

Referring to FIG. 4, in certain embodiments in accordance with the invention, a storage system 110 and more particularly a storage controller 200 may be configured with various modules and metadata to assist in reducing delays associated with restoring quarantined files. As shown in FIG. 4, a storage system 110 may be configured to store one or more files 450 on its storage drives 204. These files 450 may be susceptible to viruses or other malicious code. In certain cases, the files 450 may need to be quarantined when infected with viruses or other malicious code that cannot be fixed. In order to restore access to quarantined files 450, the quarantined files 450 may need to be restored to previously known good copies of the files 450. However, restoring files 450 that have been quarantined can require a significant amount of time.

The modules and file metadata 430 illustrated in FIG. 4 may be used to reduce delays associated with restoring quarantined files 450. In general, the modules and metadata 430 are designed to maintain a virus-free backup copy of files 450 on the same storage drives 204 used to store the files 450. When a current copy of a file 450 is quarantined due to a virus, a backup copy may be expeditiously restored so that operations may continue. Advantageously, the backup copy may be a last known good copy of the file 450. This prevents situations where a file 450 is restored to a backup copy that is several versions old. When backup copies are no longer needed, their storage space is released to a free storage pool so that it can be used again. This ensures that backup copies do not consume more space than what is needed.

In certain embodiments in accordance with the invention, metadata 430 may be established for each file 450 on the storage system 110. For example, a backup pointer 432, current pointer 434, and quarantine pointer 436 may be established for each file 450 on the storage system 110. In addition, a virus scan indicator 438 and software version indicator 440 may also be established for each file 450 on the storage system 110. In general, the current pointer 434 may point to a current copy of a file 450, the backup pointer 432 may point to a backup copy of the file 450, and quarantine pointer 436 may point to a quarantined copy, if any, of the file 450. The virus scan indicator 438 may indicate whether a current copy of a file 450 needs to be scanned for viruses. The virus scan indicator 438 may be set if the current copy needs to be scanned, and reset if the current copy does not need to be scanned or has already been scanned and found to be virus free. The software version indicator 440 may indicate a version of a software product that was used to scan a file 450. The manner in which the pointers 432, 434, 436 and indicators 438, 440 are used will be explained in more detail hereafter.

As explained above, one or more modules may be used to reduce delays associated with restoring quarantined files. These modules may include one or more of a metadata update module 402, virus scan determination module 404, virus scanning module 406, fix module 408, quarantine module 410, restore module 412, notification module 414, serialization module 416, bulk scan module 418, and backup release module 420. Although the modules are illustrated within a storage controller 200 of a storage system 110, the modules are not necessarily limited to implementation within a storage controller 200. Functionality associated with all or some of the modules, or parts of the modules, may, in certain embodiments, be located outside of the storage system 110, such as in a host system 106 or server 106 accessing the storage system 110. Thus, the location of the modules is presented by way of example and not limitation.

A metadata update module 402 may be configured to update the metadata 430 previously discussed. For example, when a current copy of a file 450 becomes a backup copy and a new current copy is generated, the metadata update module 402 may update the pointers 432, 434, to point to the new backup copy and new current copy respectively. Similarly, if a current copy of a file 450 is quarantined and a backup copy is restored to become the new current copy, the metadata update module 402 may update the pointers 434, 436 to point to the new current copy and the quarantined copy respectively. In a similar manner, if a new current copy is created or updated that has not been scanned for viruses, the metadata update module 402 may set the virus scan indicator 438 to indicate that the current copy needs to be scanned before it is read or becomes a backup copy. The metadata update module 402 may also update the software version indicator 440 to indicate which version of an antivirus product or virus definitions were used to scan a file 450.

A virus scan determination module 404 may be used to determine whether a file 450 needs to be scanned for viruses. This may be accomplished by examining the virus scan indicator 438 discussed above. If the virus scan indicator 438 is set, the virus scan determination module 404 may determine that a file 450 needs to be scanned for viruses. If the virus scan indicator 438 is not set, the virus scan determination module 404 may determine that the file 450 does not need to be scanned. In general, a current copy of a file 450 may be scanned for viruses when the current copy is read or when the current copy is updated more than once, as will be discussed in more detail hereafter. The virus scan indicator 438 may be set or unset to indicate whether the current copy needs to be scanned. Similarly, a software version indicator 440 may indicate which version of an antivirus product (e.g., antivirus software) was previously used to scan a file 450. If a newer version of an antivirus product is released (possibly with new virus definitions), a copy of a file 450 may need to be rescanned regardless of whether it was already scanned using an older version of the product. The virus scan determination module 404 may use the software version indicator 440 to determine whether a file 450 needs to be rescanned using a newer version of an antivirus product.

Once the virus scan determination module 404 determines that a current copy of a file 450 needs to be scanned, the virus scanning module 406 may scan the current copy for viruses. The scan may be performed by the virus scanning module 406 itself or outsourced to an external system or software, such as the antivirus server 106 previously discussed. If a virus is discovered, a fix module 408 may attempt to fix the current copy of the file 450 by removing or disabling the virus. If the current copy cannot be fixed, however, a quarantine module 410 may quarantine the current copy. As previously mentioned, this may include modifying the quarantine pointer 436 to point to the quarantined copy.

When a current copy of a file 450 is quarantined, a restore module 412 may restore a backup copy of the file 450. In essence, the backup copy becomes the new current copy. This may be accomplished by modifying the current pointer 434 to point to the backup copy. The backup pointer 432 may in turn be modified to have a null value (indicating that there is no backup copy) or be left alone so that the current pointer 434 and backup pointer 432 both point to the new current copy. In the second scenario, the current copy is also considered to be the backup copy.

A notification module 414 may notify a user of various events. For example, the notification module 414 may notify a user when a virus has been discovered in the current copy and/or when the current copy has been replaced with a backup copy of the file 450. The notification module 414 may also notify the user when an infected copy of a file 450 has been quarantined or fixed. In other cases, the notification module 414 may notify a user when a file 450 has been scanned and found to be virus free. Other notifications are possible and within the scope of the invention.

A serialization module 416 may be used to ensure that a file 450 is not updated while another operation (a read or write) is occurring. If an update request is received while a file is being read or updated by another request, the serialization module 416 may hold the update request until the other request (read or write) is complete. Alternatively, or additionally, a lock may be placed on the file that is being read or written to. This lock may only be released when the read or write has completed, thereby preventing other operations from occurring on the file 450 while the read or write is in process.

A bulk scan module 418 may be used to perform a bulk virus scan on all or a substantial portion of files 450 on the storage system 110. For example, if a new version of an antivirus product is released, or if updated antivirus definitions are released, the bulk scan module 418 may scan all or a substantial portion of files 450 on the storage system 110. Upon performing such a scan, a backup release module 420 may release backup copies of each of the files 450 whose current copy has been scanned and found to be virus free. In general, once a current copy of a file 450 has been scanned and found to be virus free, whether the current copy is scanned as part of a bulk scan or on its own, the backup copy may be released back to the free storage pool. The backup copy is only needed to restore a current copy in the event the current copy is found to contain a virus.

The modules illustrated in FIG. 4 may be configured to operate on data of different granularities. For example, in one embodiment, the modules may operate on complete files 450. Alternatively, the modules may operate on sub-files 452. This may be useful with large files such as video files or medical images. In such embodiments, metadata 430 may be maintained at the sub-file level instead of or in addition to the complete file level.

Figure 5:
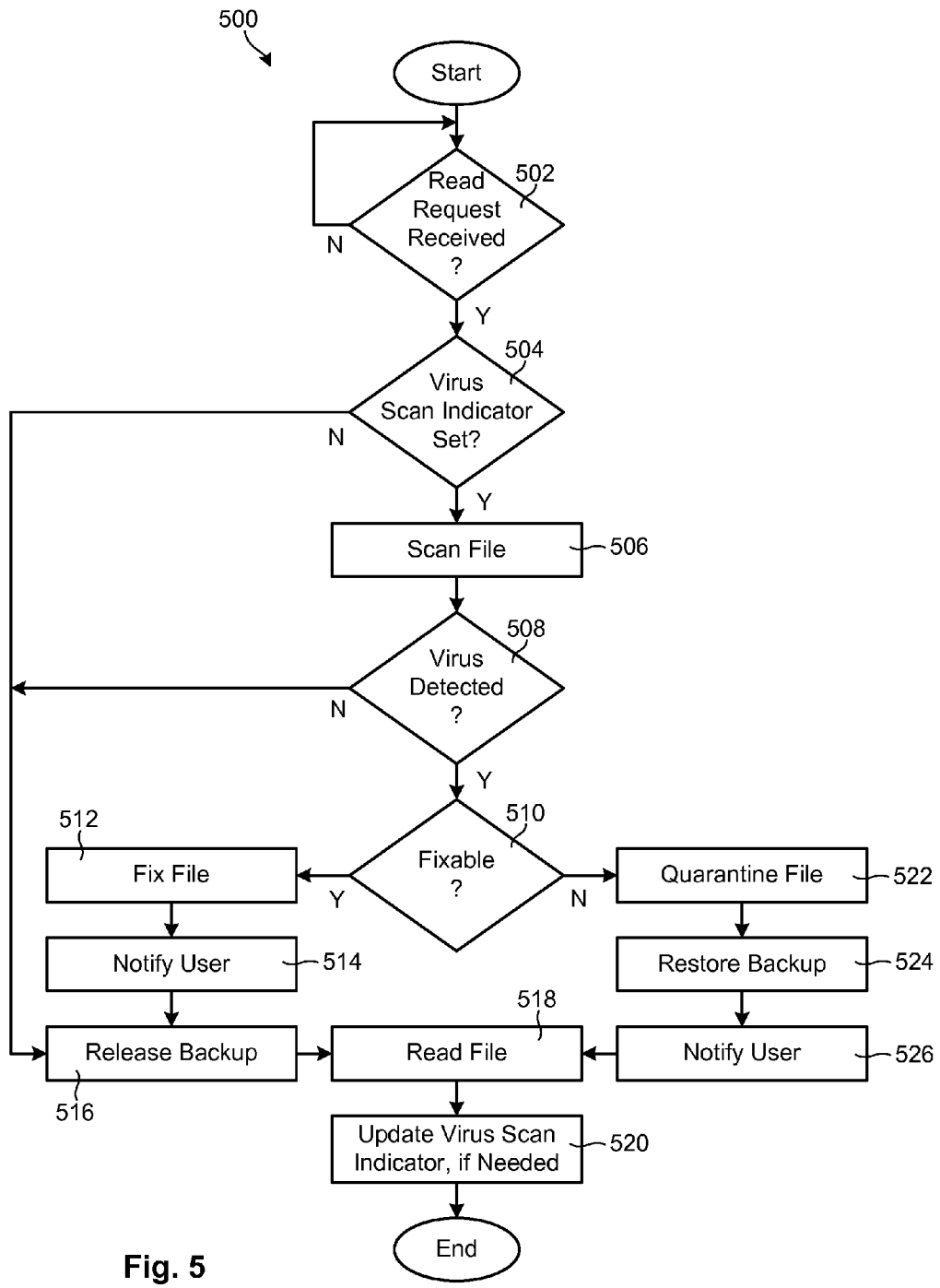
FIG. 5 is a flow diagram showing on embodiment of a method for processing a read request.

Referring to FIG. 5, one embodiment of a method 500 for processing a read request to a file 450 is illustrated. As shown, the method 500 initially determines 502 whether a read request associated with a file 450 has been received. If a read request has been received, the method determines 504 whether the virus scan indicator 438 associated with the file 450 is set. In general, the virus scan indicator 438 will be set for a file 450 where the current copy of the file 450 has not yet been scanned for viruses. If the virus scan indicator 438 is not set, the method 500 assumes that a scan has already been performed on the current copy of the file 450 and that the current copy is virus free. In such a case, the method 500 releases 516 the backup copy of the file 450, if any, since the current copy is virus free, and performs 518 the read on the current copy of the file 450. Releasing 516 the backup copy may include setting the backup pointer 432 associated with the file 450 to a null value or setting the backup pointer 432 to point to the current copy of the file 450.

If the virus scan indicator 438 is set, the method 500 scans 506 the file 450 (i.e., the current copy of the file 450) for viruses. If a virus is not detected 508 in the current copy, the method 500 releases 516 the backup copy of the file 450, if any, and performs 518 the read to the current copy of the file 450.

If, on the other hand, a virus is detected, the method 500 determines 510 whether the current copy of the file 450 can be fixed, such as by removing or disabling the virus. If the current copy of the file 450 can be fixed, the method 500 fixes 512 the current copy and notifies 514 the user. Notifying 514 the user may include notifying 514 the user that a virus has been found in the file 450 and that the file 450 has been fixed. Since the current copy of the file 450 has been fixed and is now virus free, the method 500 releases the backup copy of the file 450. The current copy of the file 450 may then be read 518.

If, on the other hand, a virus is discovered in the current copy of the file 450 that cannot be fixed, the method 500 quarantines 522 the current copy. Quarantining the current copy may include setting the quarantine pointer 436 associated with the file 450 to point to the current copy. The method 500 then restores 524 the backup copy such that the backup copy becomes the new current copy. This may be accomplished by setting the current pointer 434 associated with the file 450 to point to the backup copy. The backup pointer 432 associated with the file 450 may be set to null or continue to point to the new current copy, essentially indicating that the current copy and the backup copy are the same copy. When the backup copy is restored to become the new current copy, the method 500 may notify 526 the user that a virus has been found in the current copy and that a backup copy has been restored. The virus-free current copy of the file 450 may then be read 518.

If required, a virus scan indicator 438 associated with the file 450 may be updated 520. For example, if the virus scan indicator 438 was previously set but the current copy of the file 450 has now been scanned and verified to be virus free, or a virus has been discovered that has been fixed, or a virus free backup copy has been restored to become the new current copy, the virus scan indicator 438 may be unset to indicate that the current copy is virus free. The method 500 may then end.

Figure 6:
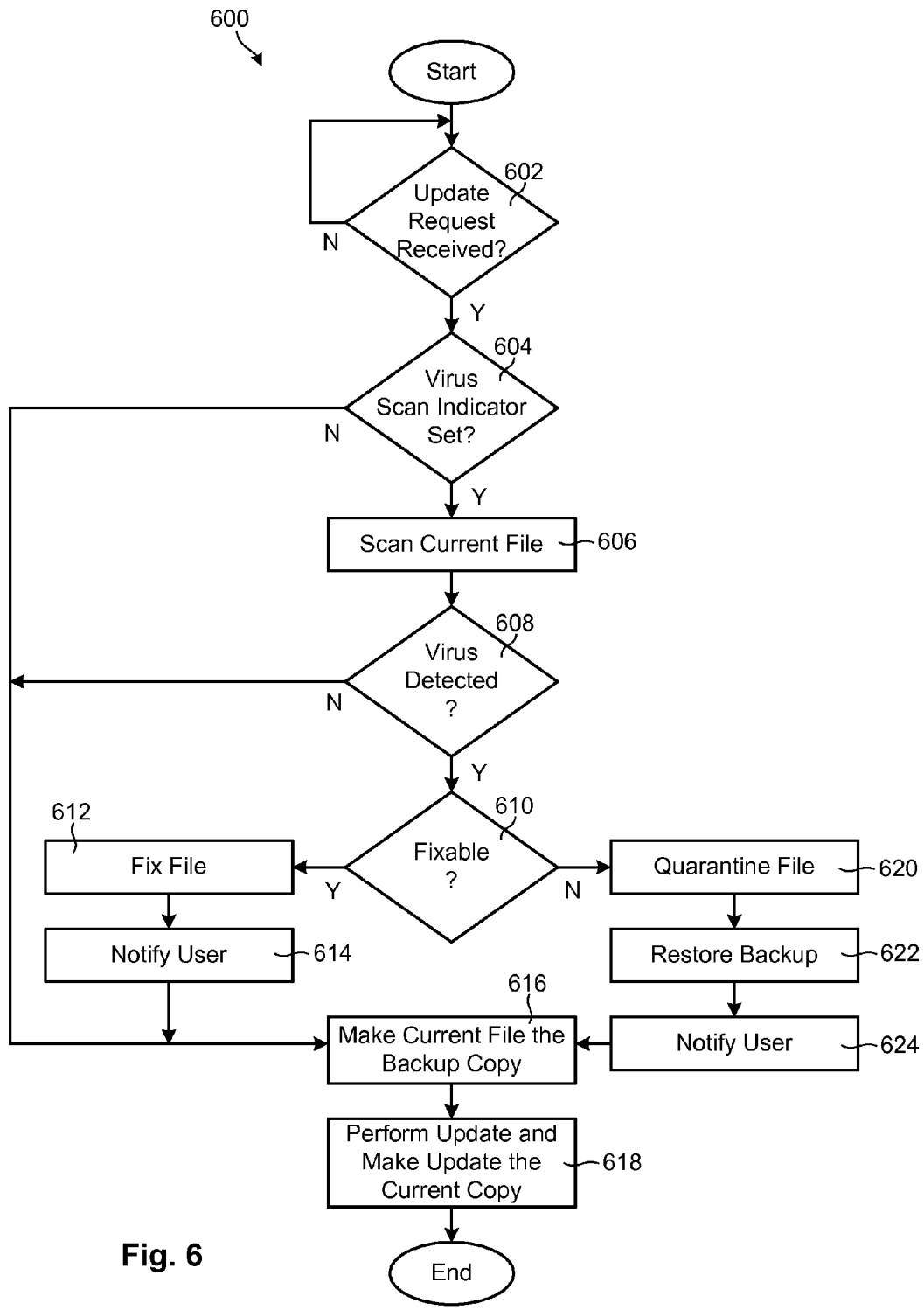
FIG. 6 is a flow diagram showing on embodiment of a method for processing a write (i.e., update) request.

Referring to FIG. 6, one embodiment of a method 600 for processing an update (i.e., write) request to a current copy of a file 450 is illustrated. As shown, the method 600 initially determines 602 whether an update request associated with a file 450 has been received. If an update request has been received, the method determines 604 whether the virus scan indicator 438 associated with the file 450 is set. As explained above, the virus scan indicator 438 of a file 450 will be set when the current copy of the file 450 has not yet been scanned for viruses. If the virus scan indicator 438 is not set, the method 600 assumes that a scan has already been performed on the current copy of the file 450 and that the current copy is virus free. In such a case, the method 600 makes 616 the current copy of the file 450 the new backup copy. This may be accomplished by modifying the backup pointer 432 to point to the current copy. The method 500 then performs 618 the update by making 618 the updated version of the current copy the new current copy.

If, at step 604, the virus scan indicator 438 is set, the method 600 scans 606 the current copy of the file 450 for viruses. If a virus is not detected 608, the method 600 makes 616 the current copy of the file 450 the new backup copy by modifying the backup pointer 432 to point to the current copy. The method 500 then performs 618 the update by making 618 the updated version of the current copy the new current copy.

If a virus is detected in the current copy at step 608, the method 600 determines 610 whether the current copy of the file 450 can be fixed, such as by removing or disabling the virus. If the current copy of the file 450 can be fixed, the method 600 fixes 612 the current copy of the file 450 and notifies 614 the user. Notifying 614 the user may include notifying 614 the user that a virus has been found in the file 450 and that the file 450 has been fixed. Since the current copy of the file 450 has been fixed and is now virus free, the method 600 makes 616 the current copy of the file 450 the new backup copy. The method 500 then performs 618 the update by making 618 the updated version of the current copy the new current copy.

If, on the other hand, a virus is discovered in the current copy of the file 450 that cannot be fixed, the method 600 quarantines 622 the current copy. This may be accomplished by setting the quarantine pointer 436 associated with the file 450 to point to the current copy. The method 600 then restores 624 the backup copy such that the backup copy becomes the new current copy. This may be accomplished by setting the current pointer 434 associated with the file 450 to point to the backup copy. The backup pointer 432 associated with the file 450 may be set to null or continue to point to the new current copy. When the backup copy is restored to become the new current copy, the method 600 may notify 624 the user that a virus has been found in the current copy and that a backup copy has been restored. Since the current copy of the file 450 has been fixed and is now virus free, the method 600 makes 616 the current copy of the file 450 the new backup copy. The method 500 performs 618 the update by making 618 the updated version of the current copy the new current copy.

Figure 7:
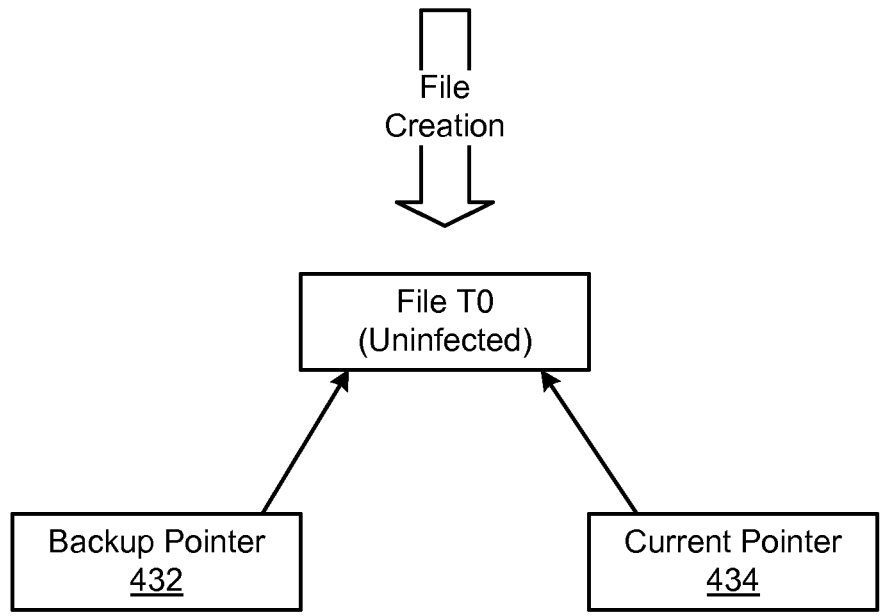
FIG. 7 is a block diagram showing a potential configuration of pointers and copies when a file is created.
Figure 8:
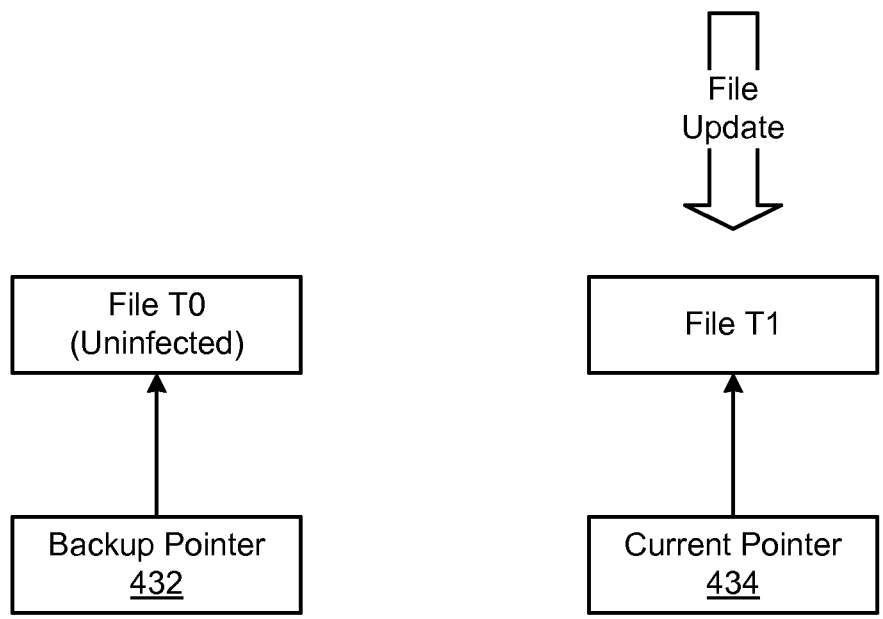
FIG. 8 is a block diagram showing a potential configuration of pointers and copies when a file is initially updated.

Referring to FIGS. 7 through 9D, various scenarios are presented to show how the methods 500, 600 discussed in association with FIGS. 5 and 6 may be implemented. The scenario in FIG. 8 is intended to follow the scenario in FIG. 7. The scenarios presented in FIGS. 9A through 9D are each alternative scenarios that are intended to follow the scenario presented in FIG. 8. The "Files" presented in FIGS. 7 through 9D are labeled to reflect their sequence in time. For example, "File T0" and "File T1" are different copies of the same file 450 at different points in time, with File T1 being an updated or changed version of File T0 and so forth. The presented scenarios are provided by way of example to enhance understanding of the methods 500, 600 discussed in association with FIGS. 5 and 6 and are not intended to be limiting.

As shown in FIG. 7, when a file 450 (i.e., "File T0") is initially created, a virus scan may be performed on this file 450 to ensure that the file 450 is virus free. A single copy of this file 450 may be stored on the storage system 110. In certain embodiments, both the current pointer 434 and the backup pointer 432 may be configured to point to the single copy of the file 450. In essence, the current copy is also considered to be the backup copy. Alternatively, the backup pointer 432 may be assigned a null value to reflect that a backup copy does not yet exist.

Referring to FIG. 8, when the file 450 (i.e., File T0) created in FIG. 7 is updated. A new file (i.e. "File T1") is created that reflects the updates to File T0. Because File T0 has already been scanned and verified to be virus free, as discussed in association with FIG. 7, File T0 becomes the backup copy without needing to perform a scan. The backup pointer 432 may remain as it is in FIG. 7 by pointing to File T0. The current pointer 434, by contrast, may be modified to point to File T1. After this scenario takes place, File T1 is the current copy and File T0 is the backup copy. File T1 is not scanned for viruses at the time it is created. Rather, the virus scan indicator 438 for the file 450 is set to indicate that File T1 (the current copy) needs to be scanned when the next read or write occurs to the file 450.

Figure 9A:
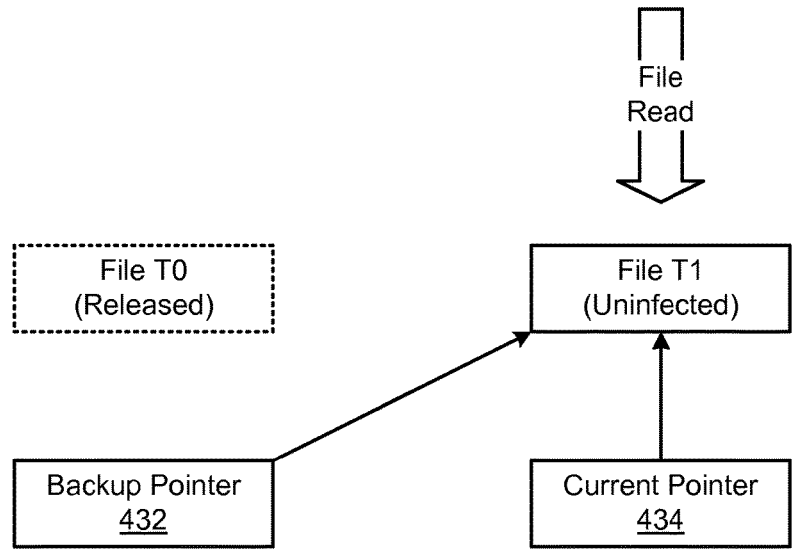
FIG. 9A is a block diagram showing a potential configuration of pointers and copies when there is an attempt to read an uninfected file after an initial update.

Referring to FIG. 9A, assume that a read request is received to read File T1 (i.e., the current copy). Upon receiving the read request, the virus scan indicator 438 for the file 450 is inspected. In this scenario, the virus scan indicator 438 is set since File T1 has not previously been scanned. In this scenario, assume that File T1 is found to be virus free. Once File T1 is found to be virus free, the backup copy of the file 450 is released since it is no longer needed. The backup pointer 432 may be set to point to the current copy (File T1), making File T1 both the current copy and the backup copy. Alternatively, the backup pointer 432 may be set to null, indicating that there is no backup copy.

Figure 9B:
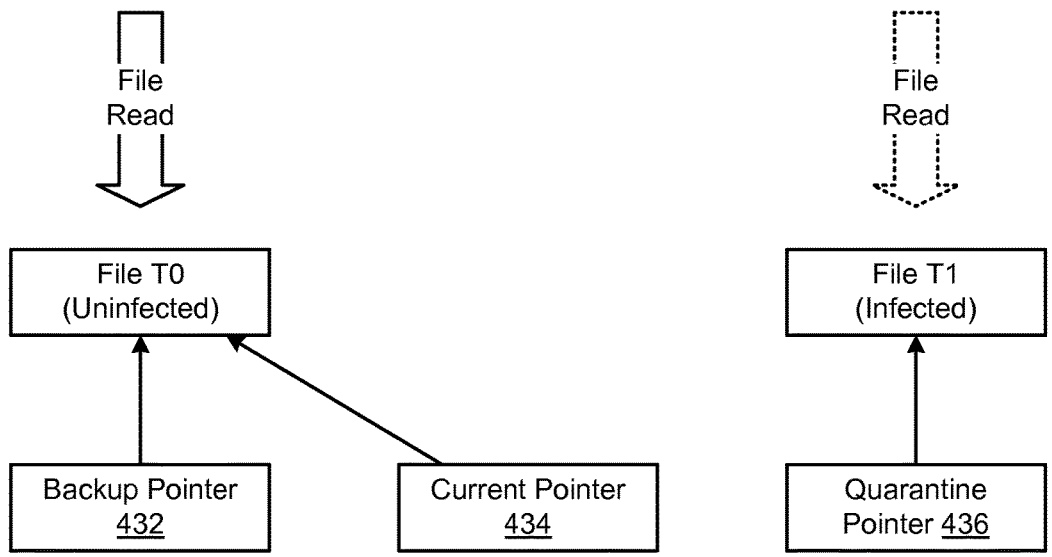
FIG. 9B is a block diagram showing a potential configuration of pointers and copies when there is an attempt to read an infected file after an initial update.

Referring to FIG. 9B, alternatively, assume a read request is received to read File T1 (i.e., the current copy) but File T1 is scanned and found to be infected with a virus. Assuming that File T1 cannot be fixed, the quarantine pointer 436 is modified to point to File T1. The backup copy (which was previously scanned and found to be virus free) may then be restored to become the new current copy. This may be accomplished by modifying the current pointer 434 to point to the backup copy. Thus, File T0 becomes the new current copy. The backup pointer 432 may be left alone so that it continues to point to File T0, thereby making File T0 both the current copy and the backup copy, or be set to null.

Figure 9C:
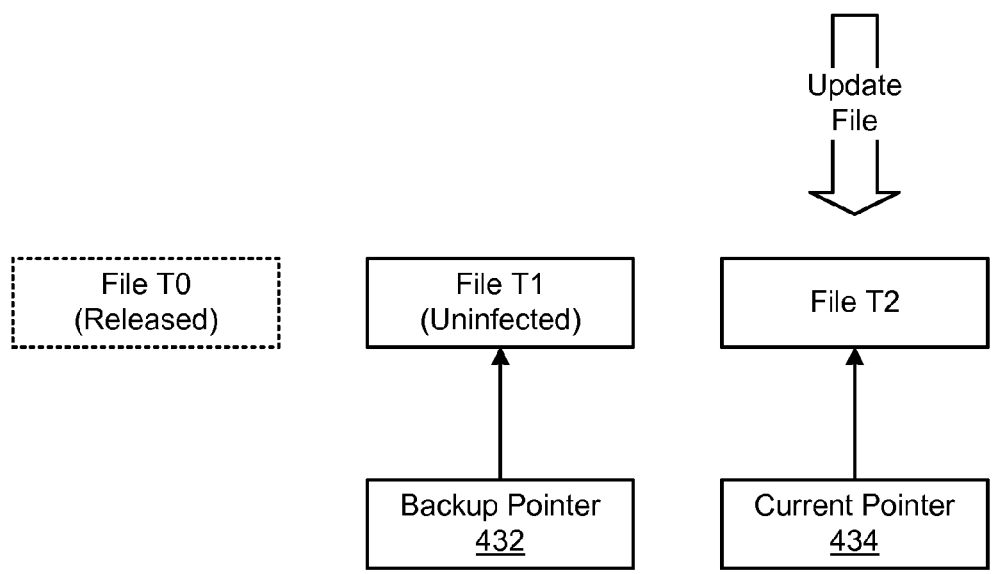
FIG. 9C is a block diagram showing a potential configuration of pointers and copies when there is an attempt to update an uninfected file after an initial update.

Referring to FIG. 9C, alternatively, assume that an update request is received to modify the current copy of the file 450 (File T1) shown in FIG. 8, thereby producing File T2. Upon receiving the update request (which is the second update request received, without any intervening read request), the virus scan indicator 438 for the file 450 is checked. As previously explained, the virus scan indicator 438 for the file 450 is set because the current copy (File T1) was not previously scanned for viruses. Assume that the current copy (File T1) is scanned and found to be virus free. In this case, the backup pointer 432 is modified to point to File T1, thereby making it the new backup copy. The old backup copy (File T0) is released, thereby allowing its storage space to be reused. The current pointer 434 is modified to point to the File T2, which becomes the new current copy. File T2 is not scanned at this time. Accordingly, the virus scan indicator 438 is set to indicate that the current copy (File T2) needs to be scanned upon receiving the next read or update request.

Figure 9D:
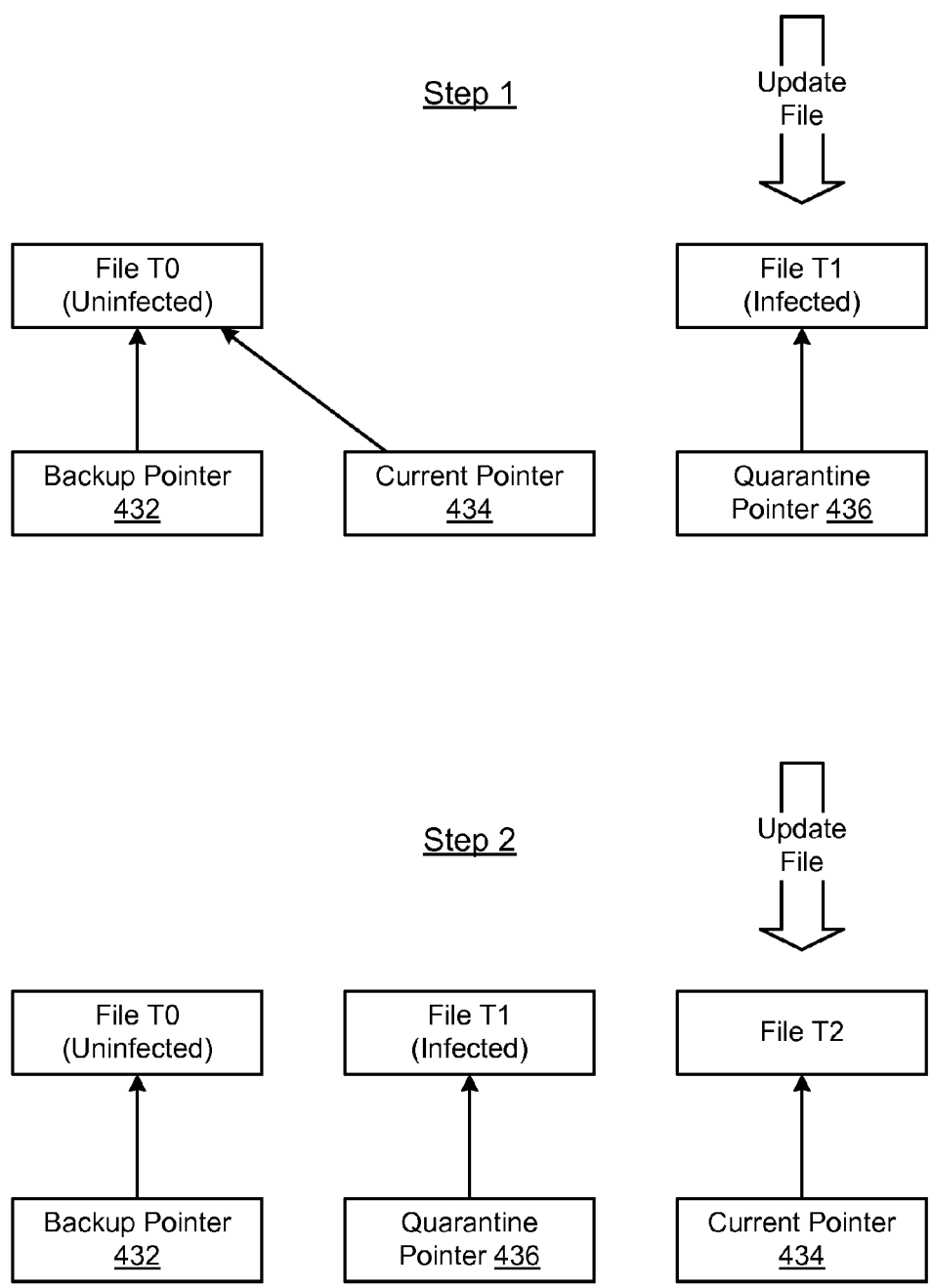
FIG. 9D is a block diagram showing a potential configuration of pointers and copies when there is an attempt to update an infected file after an initial update.

Referring to FIG. 9D, alternatively, assume that an update request is received, but that File T1 is scanned and found to be infected with a virus. A two step process may occur in this scenario. In step 1, assuming that File T1 cannot be fixed, the quarantine pointer 436 is modified to point to File T1. The current pointer 434 is then modified to point to the backup copy of the file (i.e., File T0), which has already been scanned and verified to be virus free. This makes File T0 the new current copy. The backup pointer 432 may continue to point to File T0 or be set to null.

In step 2, the update may then be applied to the new current copy (File T0) instead of to the previous current copy (File T1), which is infected with a virus. This produces File T2. The current pointer 434 is then modified to point to File T2, thereby making File T2 the new current copy. The backup pointer 432 is then modified to point to File T0, once again making it the backup copy, or the backup pointer 432 is left alone, assuming it already points to File T0.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method comprising:
   maintaining, for a file, a current copy of the file and a virus-free backup copy of the file;
   receiving a request to read the current copy; and
   performing the following in response to receiving the read request:
     scanning the current copy for viruses;
     in the event no virus is discovered in the current copy, releasing storage space occupied by the virus-free backup copy; and
     reading the current copy.

2. The method of claim 1, wherein scanning the current copy comprises scanning the current copy in the event a virus scan indicator associated with the file is set.

3. The method of claim 1, wherein releasing the storage space occupied by the virus-free backup copy further comprises causing a "backup" pointer associated with the file to point to the current copy.

4. The method of claim 1, in the event a virus is discovered in the current copy, determining whether the current copy can be fixed.

5. The method of claim 4, further comprising fixing the current copy in the event the current copy can be fixed.

6. The method of claim 1, further comprising, in the event a virus is discovered in the current copy, modifying a "quarantine" pointer to point to the current copy and modifying a "current" pointer to point to the virus-free backup copy of the file.

7. The method of claim 1, further comprising, in the event a virus is discovered in the current copy, notifying a user.

8. A computer program product comprising a non-transitory computer-readable storage medium having computer-usable program code embodied therein, the computer-usable program code comprising:
   computer-usable program code to maintain, for a file, a current copy of the file and a virus-free backup copy of the file;
   computer-usable program code to receive a request to read the current copy; and
   computer-usable program code to perform the following in response to receiving the read request:
     scan the current copy for viruses;
     in the event no virus is discovered in the current copy, release storage space occupied by the virus-free backup copy; and
     read the current copy.

9. The computer program product of claim 8, wherein scanning the current copy comprises scanning the current copy in the event a virus scan indicator associated with the file is set.

10. The computer program product of claim 8, wherein releasing the storage space occupied by the virus-free backup copy further comprises causing a "backup" pointer associated with the file to point to the current copy.

11. The computer program product of claim 8, further comprising computer-usable program code to, in the event a virus is discovered in the current copy, determine whether the current copy can be fixed.

12. The computer program product of claim 11, further comprising computer-usable program code to fix the current copy in the event the current copy can be fixed.

13. The computer program product of claim 8, further comprising computer-usable program code to, in the event a virus is discovered in the current copy, modify a "quarantine" pointer to point to the current copy and modify a "current" pointer to point to the virus-free backup copy of the file.

14. The computer program product of claim 8, further comprising computer-usable program code to, in the event a virus is discovered in the current copy, notify a user.

15. A system comprising:
   at least one processor;
   at least one memory device operably coupled to the at least one processor and storing instructions for execution on the at least one processor, the instructions causing the at least one processor to:
     maintain, for a file, a current copy of the file and a virus-free backup copy of the file;
     receive a request to read the current copy; and
     perform the following in response to receiving the read request:
       scan the current copy for viruses;
       in the event no virus is discovered in the current copy, release storage space occupied by the virus-free backup copy; and
       read the current copy.

16. The system of claim 15, wherein scanning the current copy comprises scanning the current copy in the event a virus scan indicator associated with the file is set.

17. The system of claim 15, wherein releasing the storage space occupied by the virus-free backup copy further comprises causing a "backup" pointer associated with the file to point to the current copy.

18. The system of claim 15, wherein the instructions further cause the at least one processor to, in the event a virus is discovered in the current copy, determine whether the current copy can be fixed.

19. The system of claim 18, wherein the instructions further cause the at least one processor to fix the current copy in the event the current copy can be fixed.

20. The system of claim 15, wherein the instructions further cause the at least one processor to, in the event a virus is discovered in the current copy, modify a "quarantine" pointer to point to the current copy and modify a "current" pointer to point to the virus-free backup copy of the file.

* * * * *